W. G. MEYER.
VEHICLE AXLE.
APPLICATION FILED FEB. 19, 1908.
898,588.
Patented Sept. 15, 1908.
3 SHEETS—SHEET 1.
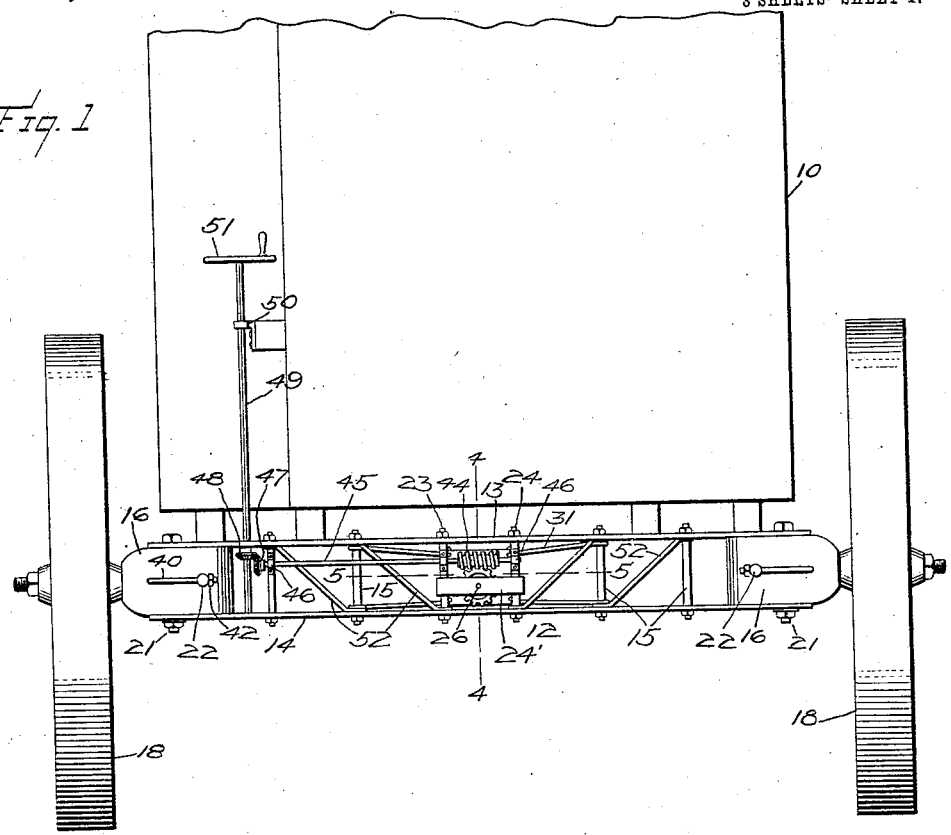
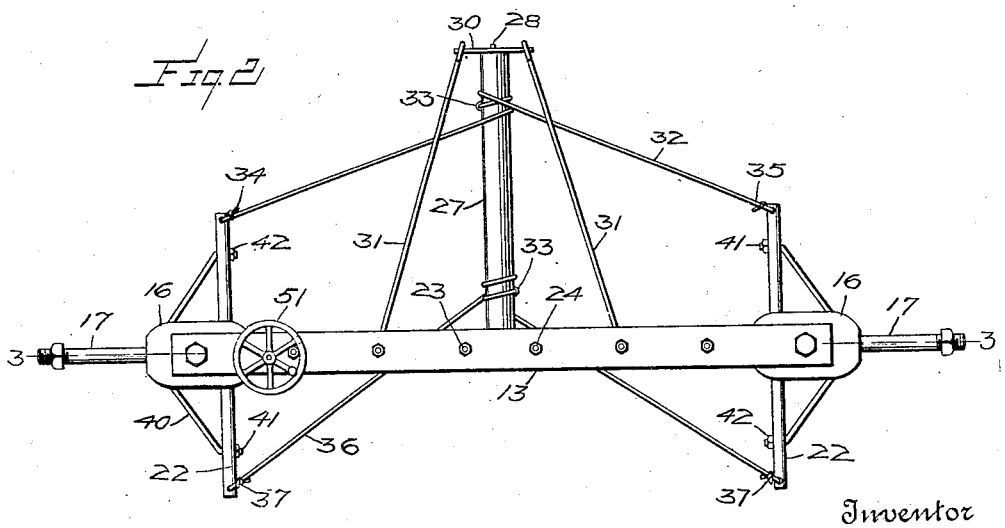
Witnesses
Edwin R. Lusby.
E. L. Chandlee
Inventor
Willie G. Meyer.
Woodward & Chandlee
Attorney W. G. MEYER.
VEHICLE AXLE.
APPLICATION FILED FEB. 19, 1908.
898,588.
Patented Sept. 15, 1908.
3 SHEETS—SHEET 2.
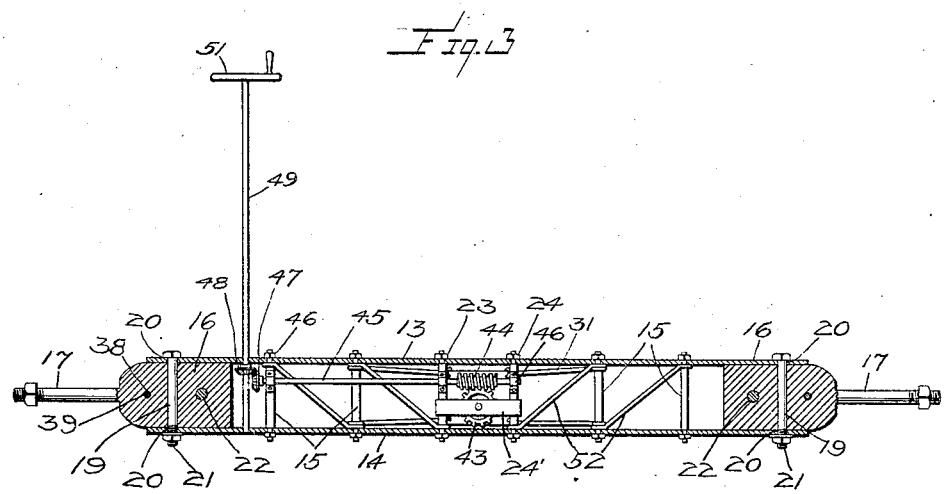
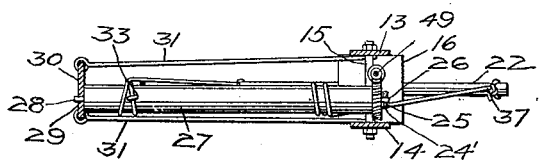
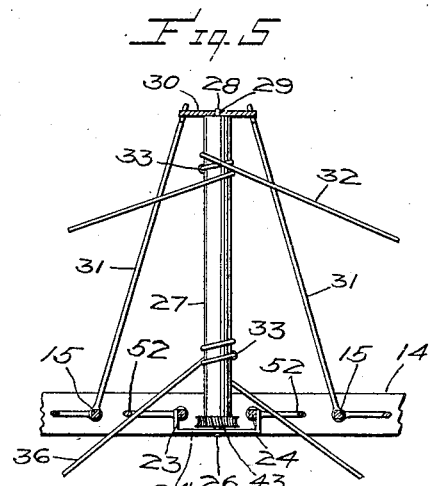
Witnesses
Edwin R. Lusby
E. L. Chandlee
Inventor
Willie G. Meyer.
Woodward & Chandlee
Attorney

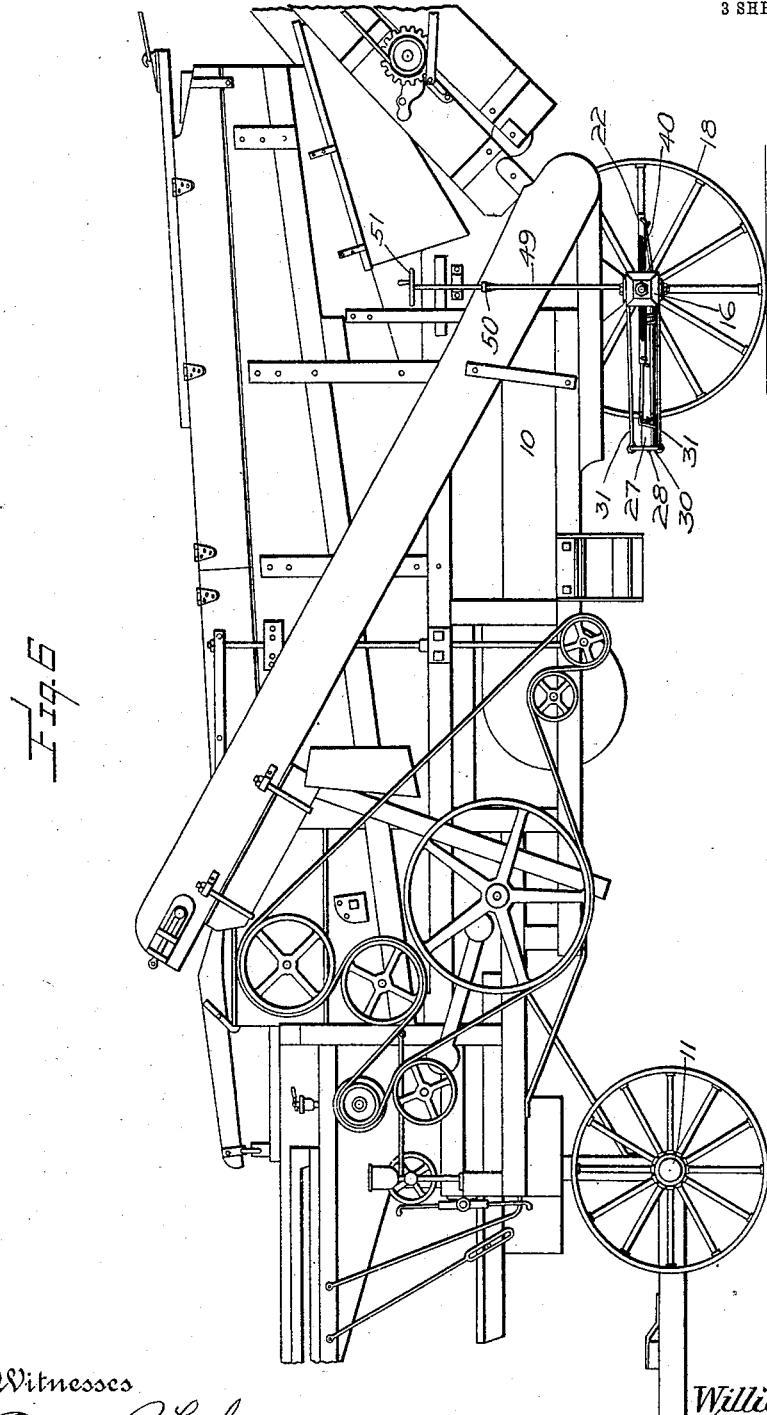

UNITED STATES PATENT OFFICE.

WILLIE G. MEYER, OF LOGANVILLE, WISCONSIN.

VEHICLE-AXLE.

No. 898,588.

Specification of Letters Patent.

Patented Sept. 15, 1908.

Application filed February 19, 1908. Serial No. 416,731.

*To all whom it may concern:*

Be it known that I, WILLIE G. MEYER, a citizen of the United States, residing at Loganville, in the county of Sauk and State of Wisconsin, have invented certain new and useful Improvements in Vehicle - Axles, of which the following is a specification.

This invention relates to the class of carriages and wagons, and more particularly to vehicle turning gears especially adapted for use upon farm machinery such as threshing machines or the like, and has for an object to provide means whereby the rear wheels of an axle may be turned at various angles and thus enable large machines to turn in small spaces, and effectively clear abrupt turns.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views. Figure 1 is a rear elevational view of a threshing machine provided with the present invention, Fig. 2 is a top plan view of the rear axle detached from the machine, Fig. 3 is a vertical longitudinal sectional view on the line 3—3 of Fig. 2, Fig. 4 is a longitudinal sectional view on the line 4—4 of Fig. 1, Fig. 5 is a horizontal sectional view on the line 5—5 of Fig. 2, Fig. 6 is a side view of a threshing machine showing the application of the present invention to its rear axle.

Referring now more particularly to the drawings, there is shown a threshing machine 10 of usual construction provided with a front wheeled axle 11, and my improved rear axle 12. The rear axle 12 consists of two metallic plates 13 and 14 respectively spaced from each other by vertically disposed standards 15. These plates are thus arranged to receive therebetween and at their ends, spindle blocks 16 having spindles 17 of ordinary construction arranged to receive ground wheels 18. The spindle blocks 16 are each provided with a vertically disposed passage 19 arranged in alinement with passages 20 formed in the plates 13 and 14 respectively, and these passages thus receive vertically disposed pivot pins or bolts 21 whereby the spindle blocks are arranged for pivotal movement. Each spindle block 16 is provided with two arms 22 arranged to extend one toward the front of the machine and one toward the rear of the machine, as shown. The purpose of these arms will be hereinafter described.
Secured to the plates 13 and 14 respectively, and at the rear thereof there are shown bars 23 and 24 respectively, and transversely connected with these bars there is shown a bearing plate 24 having a horizontally disposed passage 25 to receive the rear trunnion 26 of a drum 27. The drum 27 is somewhat elongated and extends toward the front of the machine and at the forward end, this drum is provided with a trunnion 28 journaled in a passage 29 formed in a plate 30. The plate 30 is connected to the plates 13 and 14 respectively by forwardly extending rods 31, as shown. One end of this drum 27 is thus arranged to receive a cable or chain 32 wound around the drum and secured thereto by a bolt 33. The cable has one of its free ends 34 attached to one of the forwardly extending arms 22 carried by one of the spindle blocks 16 and the other free end 35 of this cable is secured to the forwardly extending arm 22 of the opposite spindle block 16. The rear end of the drum 27 is provided with a similar cable or chain 36, and the free ends 37 of this cable are connected to the rearwardly extending arms 22 of the spindle blocks 16. Each spindle block 16 is provided with a horizontally disposed passage 38 arranged to receive the horizontal portion 39 of brace rods 40. The brace rods 40 are also provided with inwardly directed portions 41 having their ends disposed in passages formed in the arms 22. The ends of these portions 41 are threaded to receive fastening nuts 42.
At the rear end, the drum 27 is provided with a gear wheel 43, and this gear wheel receives power at times from a worm 44 in mesh with the gear, and this worm is carried by a horizontally disposed shaft 45 journaled in bearing boxes 46, as shown. At the outer end, the shaft 45 is provided with a bevel gear 47 in mesh with a similar gear 48 carried by a vertically disposed operating shaft 49 journaled in a bracket 50 secured to the machine
10. The shaft 49 at its upper end is provided with a hand wheel 51. The plates 13 and 14 respectively are braced by diagonal members 52.

It will thus be seen that an axle as herein shown and described is simple, and effective for the purpose intended and upon operating the shaft 49, the drum 27 will be revolved to wind the cables 32 and 36 respectively thereupon which in turn move the spindle blocks 16 to an inclination sufficient to enable such machines to be turned in short spaces, abrupt turns and the like.

What is claimed is:

A rear axle for vehicles comprising spaced metallic plates, pivotally mounted spindles located between said plates, a forwardly extending arm carried by each of said spindles, a rearwardly extending arm carried by each of said spindles, a revoluble drum carried by said axle, a gear carried by said drum, a driven worm carried by said axle and in mesh with said gear, a cable carried by said drum adjacent to its forward end and having its free ends connected to said forwardly extending arms, and a second cable carried by said drum and located adjacent to the rear end thereof and having its free ends connected to said rearwardly extending arms.

In testimony whereof I affix my signature, in presence of two witnesses.

WILLIE G. MEYER.

Witnesses:
FRANK LEICHER,
BERT LEICHER.